United States Patent
Vehmas et al.

(10) Patent No.: US 6,881,931 B2
(45) Date of Patent: Apr. 19, 2005

(54) METHOD AND APPARATUS FOR HEATING GLASS

(75) Inventors: Jukka Vehmas, Tampere (FI); Jorma Valkama, Tampere (FI)

(73) Assignee: Uniglass Engineering Oy, Tampere (FI)

( * ) Notice: Subject to any disclaimer, the term of this patent is extended or adjusted under 35 U.S.C. 154(b) by 0 days.

(21) Appl. No.: 10/881,941

(22) Filed: Jun. 30, 2004

(65) Prior Publication Data

US 2004/0232135 A1 Nov. 25, 2004

Related U.S. Application Data

(62) Division of application No. 09/707,036, filed on Nov. 6, 2000, which is a continuation of application No. PCT/FI00/00943, filed on Oct. 31, 2000, now Pat. No. 6,776,008.

(30) Foreign Application Priority Data

Nov. 1, 1999 (FI) .............................................. 19992359

(51) Int. Cl.[7] .............................. F27B 9/10; F27B 9/36; C03B 27/044
(52) U.S. Cl. ........................ 219/400; 219/388; 65/355
(58) Field of Search ................................ 219/388, 400; 65/114, 119, 161–163, 355

(56) References Cited

U.S. PATENT DOCUMENTS

| | | | |
|---|---|---|---|
| 2,089,250 A | 8/1937 | Cone | |
| 3,223,501 A | 12/1965 | Fredley et al. | |
| 3,298,810 A | 1/1967 | McKelvey | |
| 3,332,759 A | 7/1967 | McMaster et al. | |
| 3,844,757 A | 10/1974 | Kaufman et al. | |
| 3,907,132 A | 9/1975 | McMaster et al. | |
| 4,059,426 A | 11/1977 | Starr | |
| 4,397,672 A | 8/1983 | Nitschke | |
| 4,505,671 A | 3/1985 | McMaster | |
| 4,620,864 A | 11/1986 | McMaster | |
| 4,735,646 A | * 4/1988 | Aratani et al. | ................. 65/114 |
| 4,738,705 A | 4/1988 | McMaster et al. | |
| 4,773,926 A | * 9/1988 | Letemps et al. | ............... 65/114 |
| 5,057,138 A | 10/1991 | Vehmas et al. | |
| 5,110,338 A | 5/1992 | McMaster | |
| 5,647,882 A | 7/1997 | Thiessen | |
| 5,951,734 A | 9/1999 | Friedel et al. | |
| 6,172,336 B1 | 1/2001 | Vehmas | |
| 6,282,923 B1 | 9/2001 | Vehmas | |

FOREIGN PATENT DOCUMENTS

| | | |
|---|---|---|
| EP | 0721922 | 12/1995 |
| EP | 0897896 | 2/1999 |
| EP | 0937687 | 8/1999 |
| FI | 62043 | 7/1982 |
| FI | 83072 | 2/1991 |
| FI | 962158 | 5/1996 |
| FI | 962162 | 5/1996 |
| WO | 9744283 | 11/1997 |
| WO | 9744284 | 11/1997 |

* cited by examiner

Primary Examiner—Joseph Pelham
(74) Attorney, Agent, or Firm—Ladas & Parry LLP

(57) ABSTRACT

A method and apparatus for heating glass, in which glass (4) is heated upon rollers (3) in a tempering furnace (1) from above and below of the glass (4). At least the upper surface of the glass (4) is heated with hot air jets directed substantially perpendicularly relative to the surface of the glass (4). The air jets have been provided by sucking air mainly from the inside of the furnace and by pressurizing the air taken from the inside of the tempering furnace (1) to an overpressure of over 0.1 bar relative to the pressure in the tempering furnace (1).

8 Claims, 2 Drawing Sheets

METHOD AND APPARATUS FOR HEATING GLASS

CROSS-RELATED APPLICATION

This application is a divisional of application Ser. No. 09/707,036 filed on Nov. 6, 2000 now U.S. Pat. No. 6,776,008, which is a continuation of International Application PCT/FI00/00943 filed on Oct. 31, 2000, which designated the U.S., claims the benefit thereof and incorporates the same by reference.

FIELD OF THE INVENTION

The invention relates to a method of heating glass, in which method glass is led through a tempering furnace, whereby the glass is heated from above and below, whereby air is blown at least onto the upper surface of the glass to heat the glass in such a way that air is sucked from the inside of the tempering furnace, the air being circulated in such a way that it is blown back onto the glass.

Further, the invention relates to an apparatus for heating glass, which apparatus comprises a tempering furnace comprising means arranged to support the glass and to form its conveyor and means for sucking air from the inside of the tempering furnace and for circulating the air to be blown back at least onto the upper surface of the glass.

BACKGROUND

When glass is heated by means of an oscillating roller furnace, the problem is that the edges of the glass curve upwards at the initial stage of the heating. This is due to the great heat flow onto the lower surface of the glass caused by the ceramic rollers used in the furnace at the initial stage of the heating cycle, compared with the heat flow onto the upper surface of the glass. Consequently, the edges of the glass curve upwards, the central area of the glass being easily affected by optical errors, and in addition, the glass becomes unevenly heated. When selective glasses are heated, the situation is particularly difficult, because selective glasses reflect heat radiation particularly intensively. Glasses with selective surfaces are usually heated in such a way that the selective surface faces upwards, whereby the heating of the upper surface of the glass is remarkably more difficult compared with the heating of the lower surface of the glass. Thus, the heating times of selective glasses are naturally longer than the heating times of ordinary clear glass, whereby the capacity of the furnace is typically rather low when selective glasses are heated.

FI patent 62043 discloses a method of preventing the curving of glass. In this method, the upper surface of the glass is subjected to a heat flow by means of forced convection, which heat flow compensates for the heat flow from the rollers below. The forced convection has been provided by blowing horizontal narrow air jets in the longitudinal direction of the furnace, which provide a turbulence effect of air with an injector effect onto the upper surface of the glass. The air jets have been achieved by taking pressurized air compressed by compressors from a compressed-air network outside the furnace. FI patent 83072 discloses a corresponding method, in which the air blown as air jets is also circulated through the lower section of the furnace, whereby the air is heated during this extra round. At the same time, the heat transferred to the air is taken from the lower part of the glass. In both of the methods the effect of the convection is rather low, whereby the method is rather ineffective. The air to be conveyed into the furnace is cold, so that it cools the furnace in its entirety, which increases the energy consumption of the furnace in total. Further, a problem is the uncontrolled discharge of the air to be blown from the furnace. Further still, the emphasis in the method is on intensifying the heating of the upper surface of the glass at the initial stage of the heating. Thus, the total heating time of selective glasses is long, because selective glasses are, in any case, primarily heated from the lower part of the glass applying the radiation principle.

EP publication 0897896 discloses a solution in which coated glass is heated by blowing air onto it from longitudinal blowpipes. The air to be blown is taken from a compressed-air network outside the furnace. The arrangement comprises a compressed-air tank which is provided with overpressure by means of a compressed-air compressor. Due to the compressed-air arrangement, the structure of the solution becomes complex and expensive. If cold air is blown into the furnace, it cools the furnace in its entirety, and thermal energy has to be directed into the furnace in some other way. Heating the air to be blown, in turn, requires a large amount of energy and capacity, so that what it comes to the energy economy, the solution according to EP publication 0897896 is, as a whole, poor. Further, the uncontrolled discharge of the air to be blown from the furnace is a great problem.

FI publication 962158 discloses a method in which the surfaces at the lower side of the glass are cooled at the initial stage of the heating cycle, and correspondingly, the heat transfer of the lower side is intensified at the final stage of the heating cycle by blowing hot air directly to the lower surface of the glass. FI publication 962162 discloses a solution, in which the heating resistors are dimensioned and their control implemented in such a way that the heating resistors are many times more efficient, whereby the heating of the glass at the initial stage of the heating cycle may be performed by utilizing the upper resistors only. The methods are very efficient and well-functioning, but it would be desirable, particularly when heating selective glasses, to make the heating time shorter.

A known solution is also what is known as a convection furnace, in which the intention is to heat glass by blowing hot air onto the upper and lower surfaces of the glass, as well as to the ceramic rollers. In such a solution, air is circulated in the furnace with blowers constructed inside the furnace, whereby the flow velocity of the air is increased, the aim being thus to increase the effect of the air on the surface of the glass. The air is blown at a pressure of approximately 0.005–0.01 bar. The air is heated in the solution either prior to the blower or after the blower. A problem of the solution is particularly the high manufacturing cost, and the slow speed of the heating due to the large mass of the air channels constructed inside the furnace, and uncontrollable heat expansions of the construction.

U.S. Pat. No. 4,505,671 discloses a solution in which glass is heated by blowing heated gas onto its upper and lower surfaces. The gas is taken from a separate gas source and heated with a separate heater. The solution consumes considerable amounts of gas from the gas source. Further, heating gas consumes energy. Increasing the amount of flowing gas and thus increasing the heat-transfer coefficient is in this solution rather difficult.

U.S. Pat. No. 4,059,426 describes a solution in which the glass is supported by gas jets and air is blown with a blower onto the surface of the glass sheet, the air being circulated back to the blower. However, this kind of solution does not allow the surface of the glasses to be subjected to a sufficient heat effect. Further, the publication discloses a solution providing air circulation inside a furnace by utilizing the Coanda phenomenon. The air circulation inside a furnace does not provide a sufficient heat effect on the surface of the glasses either.

Moreover, a solution is known in which the glass is heated in two steps. At the first stage, a lower temperature is used, whereby air having a temperature of about 300 to 400° C. is circulated in the furnace by means of blowers. The air is blown directly onto the upper and lower surfaces of the glass and heated prior to the blowers. At the latter stage, the glass is heated using mainly radiation heating. In this solution, too, the problem has turned out to be the high cost of the air channel system constructed inside the furnace and of the blowers used in the solution. Further, the heating of the glass at the latter stage takes rather a long time, particularly when selective glasses are heated.

An object of this invention is to provide an improved method and apparatus for heating glass.

SUMMARY OF THE INVENTION

The method according to the invention is characterized by leading the glass through a tempering furnace by means of a conveyor consisting of rollers; pressurizing the air sucked from the tempering furnace by applying the compressor principle to an overpressure of over 0.1 bar relative to the pressure in the tempering furnace; leading the pressurized air by means of a pipe system into the vicinity of the surface of the glass located upon the rollers; and blowing the air substantially perpendicularly onto the upper surface of the glass.

Further, the apparatus according to the invention is characterized in that the apparatus comprises horizontal rollers, which are arranged to support the glass and to form its conveyor; a pressurization unit; a return pipe of the upper side; and blow pipes of the upper side, which blow pipes are arranged in the vicinity of the surface of the glass, whereby the return pipe is arranged to convey air from the tempering furnace to the pressurization unit, and the pressurization unit is arranged to pressurize the air conveyed from the tempering furnace to an overpressure of 0.1 bar relative to the pressure of the tempering furnace by applying the compressor principle, whereby the pressurized air is hot and arranged to be blown through the blow pipes of the upper side substantially perpendicularly onto the upper surface of the glass.

An essential idea of the invention is that glass is heated upon rollers in a tempering furnace from the upper and lower sides of the glass. At least the upper surface of the glass is heated with air jets directed substantially perpendicularly, i.e. at an angle of below 45° relative to the perpendicular of the glass surface in such a way that the air has been directed by means of a pipe system into the vicinity of the glass, the air jets having been provided by sucking air mainly from the inside of the furnace and by pressurizing the air taken from the inside of the furnace to an overpressure of 0.1 bar relative to the pressure of the tempering furnace by applying the compressor principle. The idea of a preferred embodiment is that the lower surface of the glass is also heated in a corresponding way with hot air jets, which air jets have been provided by taking air mainly from the inside of the furnace and by pressurizing the air taken from the inside of the furnace to an overpressure of 0.1 bar relative to the pressure of the tempering furnace. The idea of a second preferred embodiment is that glass is also heated by means of electric resistors.

An advantage of the invention is that since the pressure level of the air is fairly high, a high discharge velocity is achieved for the air, and at the same time, a very high heat-transfer coefficient on the surface of the glass is achieved. Since the air blown is hot, air can be blown directly as far as onto the glass surface and air can also be blown until the end of the heating cycle of the glass. Further, owing to the high pressure level and the hot air, high heat-transfer coefficients can be achieved with a small amount of air, whereby the pipe system of the apparatus is small and simple and thus there are no risks what it comes to thermal movements. Since in the solution the air to be blown is taken from the inside of the furnace, the furnace has no problems that would be caused by the discharge of excessive air. Further, the amount of air and at the same time the heat-transfer coefficient can be increased basically without limits. Increasing the amount of air and the heat-transfer coefficient can be performed simply by increasing the size of the pressurization unit, whereby the heat losses of the furnace do not increase significantly. A significantly shorter heating time is achieved for the glass by means of the method according to the invention. Particularly when selective glasses are heated, the heating time can be made considerably shorter, because the solution according to the invention utilizes convection heating in a very efficient manner, and the radiation properties of the glass surface do not substantially weaken the effect of the convection heating. What is known as a heating profile can be created for the furnace by means of electric resistors, convection blowing having at the same time enabled the raising of the furnace capacity. Further, a furnace provided with a heating resistor is very easy to keep in balance compared with for example convection furnaces where the intention is to implement the heating with mere air jets. In such solutions, the channel system surfaces in the vicinity of the glass get cool compared with the rest of the area and may cause imbalance in the furnace. The solution is very easy to mount afterwards, because the apparatus and its pipe system are small in size and simple.

BRIEF DESCRIPTION OF THE DRAWINGS

The invention is explained in more detail in the attached drawings in which.

DETAILED DESCRIPTION

Figure 1:
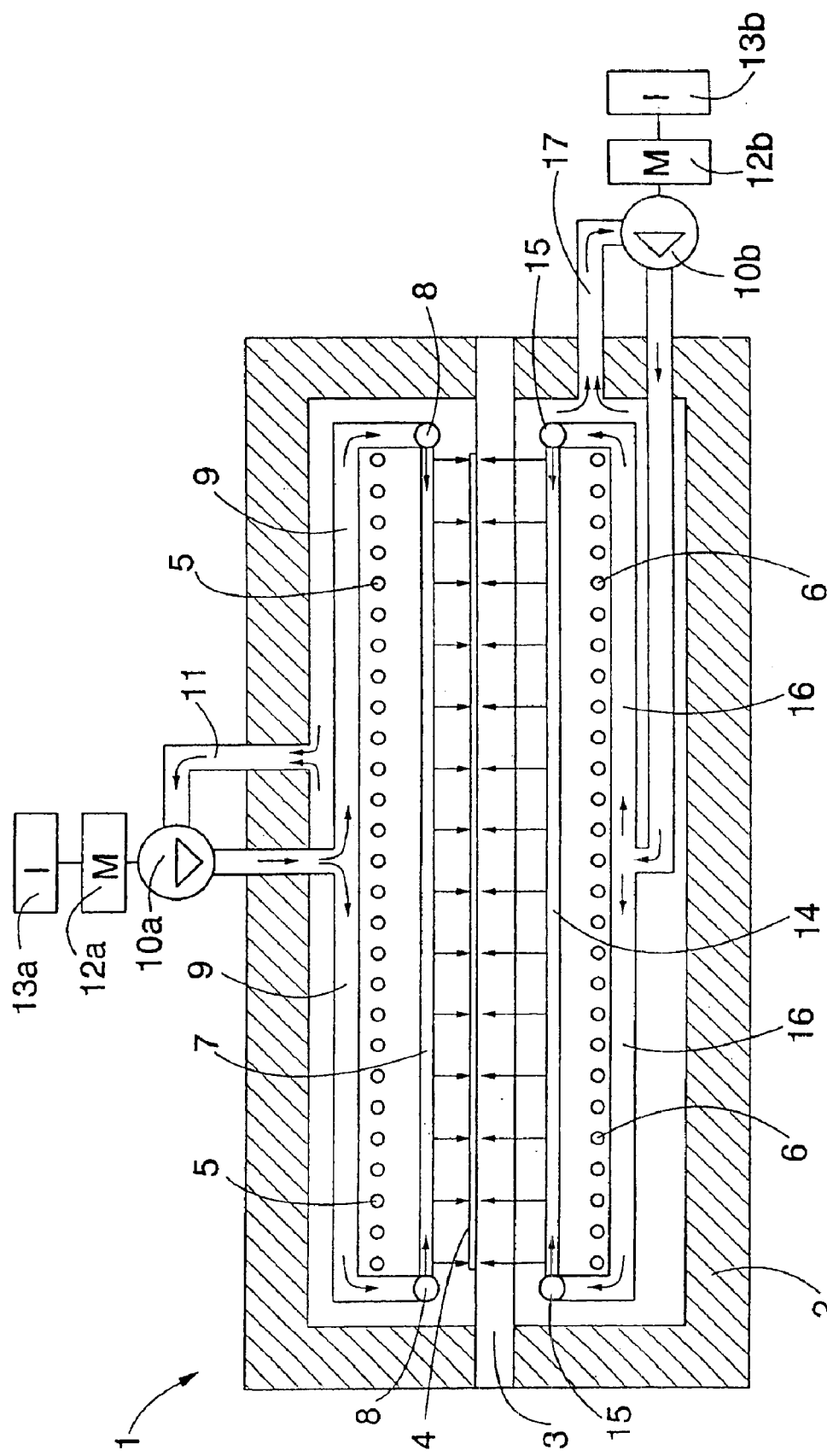
FIG. 1 shows a schematic front view of a cross-section of an apparatus according to the invention.

FIG. 1 shows a schematic end view of a cross-section of the tempering furnace 1. The tempering furnace 1 comprises a frame 2 and rollers 3. During the heating in the furnace 1, glass 4 is arranged upon the rollers 3. Typically, the rollers 3 are ceramic rollers, for example. The tempering furnace 1 may comprise upper resistors 5 for heating the glass 4 from above and lower resistors 6 for heating the glass from below. The temperature of the glass 4 in the furnace is typically raised to 610 to 625° C., for example, depending on the thickness of the glass.

In the glass tempering furnace 1, the glass 4 is moved forwards and backwards during the heating, in other words oscillated by means of the rollers 3 in a manner known per se, so that the supporting points of the rollers 3 can be made even all through the heating stage for the whole glass 4. In this way, deformation errors in the optics of the glass caused by uneven support of the glass are minimized.

The tempering furnace 1 further comprises blow pipes 7 of the upper side, by means of which hot air preferably having a temperature of over 600° C. is blown onto the upper surface of the glass 4. The temperature of the air to be blown is about 650° C., for example. The blow pipes 7 of the upper side are arranged crosswise in the furnace 1, in other words they are substantially perpendicular relative to the direction of travel of the glass 4. The air is conveyed by means of the tube system to the vicinity of the surface of the glass 4, i.e. the distance of the upper side blow pipes 7 from the surface of the rollers 3 is below 300 mm, for example 60 mm. Further, the distance of the pipes 7 from each other is 100 to 300 mm, for example. The material of the pipe 7 is for example acid-resistant steel, the inner diameter being for example 20 mm. The diameter of the blow hole is below 2.5 mm, typically for example about 1.5 mm, and the distance of the holes from each other is for example 25 mm. The blow holes are arranged to alternate in such a way that every other hole blows forwards at an angle of about 30° relative to the perpendicular of the surface of the glass 4, and every other hole blows backwards at an angle of about 30° relative to the perpendicular of the surface of the glass 4. Thus, air is blown substantially perpendicularly onto the surface of the glass 4, i.e. at an angle of below 45° relative to the perpendicular of the surface of the glass.

The air is supplied into the blow pipes 7 of the upper side from upper side delivery pipes 8. The upper side delivery pipes 8 are arranged at both edges of the furnace 1 longitudinally in the direction of travel of the glass 4. The upper side delivery pipes 8 are arranged at a distance of about 50 mm from the surface of the rollers 3. The upper side blow pipes 7 are attached to both upper side delivery pipes 8, whereby the pipes form a ladder-like structure, in other words each upper side blow pipe 7 is provided with air from both ends in the manner illustrated in FIG. 2. The diameter of the upper side delivery pipe 8 is 40 mm, for example.

The air is supplied into the upper side delivery pipe 8 by means of a feed pipe 9. The upper side feed pipe 9 can be attached to the center of the upper side delivery pipe 8, for example. On the other hand, in longer furnaces more than one upper side feed pipes 9 may be used per each upper side delivery pipe 8.

The is supplied into the pipes by means of a pressurization unit 10a. The pressurization unit 10a sucks hot air from the furnace along the upper side return pipe 11. The pressurization unit 10a sucks air from at least two points, preferably from the center-line of the furnace 1 from the ceiling of the furnace from both ends of the furnace. The pressurization unit 10a pressurizes the air primarily by pressing, i.e. applying the compressor principle. The speed of rotation of the pressurization unit 10a is over 15,000 rotations per minute, preferably over 20,000 rotations per minute, and it may be for example a compressor resistant to heat or a turbine of a turbocharger. The pressurization unit 10a provides an overpressure of over 0.1 bar, preferably over 0.5 bar or up to 1 bar relative to the pressure of the furnace 1. The rotational speed of the pressurization unit must be this high, so that the air can be blown through the fairly small pipes and nozzle holes at a sufficiently high speed.

The lower part of the tempering furnace 1 is provided with blow pipes 14 arranged crosswise in the furnace for example at every other roller spacing. The size of the lower side blow pipes 14 are corresponding to the size of the upper side blow pipes 7 and are located for example about 20 mm below the lower surface of the rollers 3. The blow holes are positioned directly upwards in such a way that there are spaces of for example 25 mm between them, their hole size being the same as the size of the holes of the upper side blow pipes 7. In addition, nozzles are arranged in the holes by means of which it is ensured that the air is blown onto the glass without the air flow substantially contacting the rollers 3. Thus, the rollers 3 are not subjected to uncontrolled heat transfer at any stage.

The lower side blow pipes 14 are supplied with air from lower side delivery pipes 15. The lower side delivery pipes 15 are located at both edges of the furnace 1 longitudinally in the direction of travel of the glass. The distance of the lower side delivery pipes 15 on the lower surface of the rollers 3 is for example 50 mm. The lower side blow pipes 14 are attached to both lower side delivery pipes 15, whereby the pipes form a ladder-like structure in a corresponding way to the upper side pipes, in other words air is fed into the lower side blow pipe 14 from its both ends. The diameter of the lower side delivery pipes 15 is for example 40 mm.

Moreover, the furnace comprises lower side feed pipes 16, by means of which air is supplied into the lower side delivery pipes 15. The lower side feed pipe 16 is arranged at the center of the lower side delivery pipe 15, but for example in longer furnaces air can be supplied by means of more than one supply pipe 16 per each lower side delivery pipe 15.

A pressurization unit 10b feeding air to the lower side is corresponding to the pressurization unit 10a feeding air to the upper side. The pressurization unit 10b sucks the air from the lower part of the tempering furnace along the lower side return pipe 17, preferably from at least two points from the center-line of the furnace from the wall of the furnace or from the bottom from both ends of the furnace. The temperature of the air to be blown to the lower side is preferably over 600° C., for example about 650° C.

The pipe systems, holes and the air pressure are dimensioned in such a way that the speed of the air flowing from the holes of the blow pipes 7 and 14 is very high, for example over 50 m/s, preferably over 100 m/s. FIG. 1 illustrates the air flow in the furnace with arrows. The aim is to make the glass 4 to heat as efficiently as possible, i.e. to make the heat transfer φ as intensive as possible. The heat transfer φ can be illustrated by the equation $$\phi = \alpha * \Delta T_i$$

where

α is a heating coefficient $\Delta T$ is $T_l - T_i$ $T_i$ is the temperature of the air, and $T_l$ is the temperature of the glass.

In order for the heat transfer φ to be as intensive as possible, the heat-transfer coefficient α should be as high as possible. The heat-transfer coefficient α, in turn, depends at least on the discharge velocity, mass flow of the air, the diameter of the blow holes, the distance of the blow holes from each other and the distance of the blow holes from the glass, in other words it is the function of said variables, i.e.

$$\alpha = f(v, m, d, h, l),$$

where v is the discharge velocity;

m is the mass flow of the air;

d is the diameter of the blow holes;

h is the distance of the blow holes from each other; and l is the distance of the blow holes from the glass.

The effect of the variables of the function on the heat-transfer coefficient α is very difficult to define accurately. In addition, changing one variable may also change other variables, so that all in all, definition and optimization of the heat transfer coefficient α is a very difficult task. Increasing the discharge velocity v of the air, the mass flow m of the air and the diameter d of the blow holes increases the heat transfer coefficient α. However, if the mass flow m of the air is large, there is also a large amount of air in the channels, and thus the size of the pipe system would grow too much and the structure of the apparatus would become expensive. Therefore, it is not reasonable to increase the mass flow m too much. As to the most optimal structure of the apparatus, the aim is a heat-transfer coefficient α that is as high as possible achieved by means of a mass flow m that is as small as possible. Decreasing the diameter d of the blow holes decreases the heat transfer coefficient α, but decreasing the diameter d of the blow holes also decreases the mass flow m of the air. When the diameter of the blow holes is below 2.5 mm, it has been possible to make the mass flow m of the air reasonably small without decreasing the heat-transfer coefficient α too much. On the other hand, the discharge velocity v has a fairly great effect on the value of the heat-transfer coefficient α, so that when the discharge velocity v of the air is arranged to be higher than 50 m/s, the solution according to the invention enables optimization of the apparatus in such way that the heat-transfer coefficient α is surprisingly rather high, and correspondingly, the mass flow m of the air is reasonably small.

There is a drive motor 12a in connection with the upper side pressurization unit 10a, whereby the drive motor 12a is connected to the pressurization unit 10a either via a gearbox, or direct use may also be used. The drive motor may be a squirrel cage induction motor, for example, the rotational speed of which is controlled by means of an inverter 13a. In the corresponding way, there is a drive motor 12b, the rotational speed of which can be arranged to be controlled by the inverter 13b. As the pressurization units 10a and 10b are arranged outside the furnace 1, the channel systems and pipes connected to them are naturally insulated very efficiently. The frame 2 has also good insulation, so that the heat inside the furnace 1 will not escape. Despite the good insulation of the furnace, channel systems and pipe systems, the air cools slightly in the channel system outside the furnace. An object of the solution is to attempt to intensify the heating of the furnace 1 in such a way that the heating time of the glass 4 could be made up to about 25 to 30% shorter in the case of ordinary glass compared with the present situation and up to 40% shorter compared with the present situation when selective glass is heated. In the solution according to the invention, cold air is not considerably used because it would cause losses in the furnace. The capacity of the pressurization unit 10a and 10b may be 30 kW, for example. The capacity of the furnace rises more than the connected load, however, because not as much reserve needs to be taken for the resistor dimensioning as before but the power demand is more even. This is essential in such cases, in particular, where furnace is provided with the pressurization unit afterwards. Previously, the heating time of selective glasses was clearly longer than the heating time of clear glasses. Since in the heating hot air is blown at a high speed onto the surface of the glass, the heating of clear glass and selective glass takes place almost equally rapidly. Thus, compared with the earlier situation, the capacity of the furnace in selective glass use increases even more than when clear glasses are heated.

Figure 2:
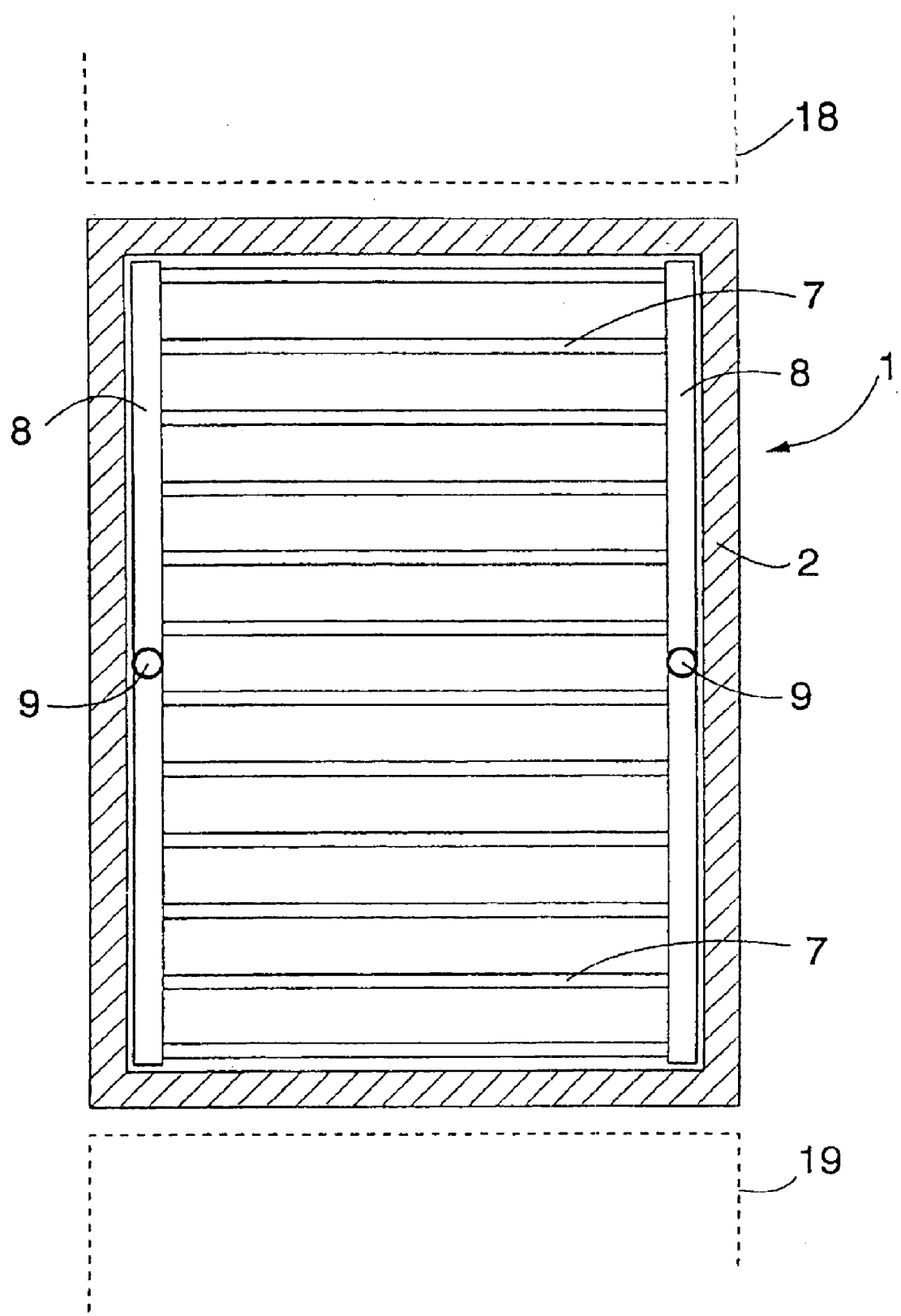
FIG. 2 shows a top view of a cross-section of the apparatus according to FIG. 1.

In the heating process of the glass 4, the glass 4 is first transferred into the furnace 1 by means of a loading conveyor 18 shown in FIG. 2. In the furnace 1, the glass 4 is oscillated in an ordinary way upon the rollers 3. The temperature of the furnace is set to a temperature of about 670° C., for example. When the glass 4 arrives in the furnace, the upper resistors 5 are on according to a predefined heating profile. The convection blow of the upper side is arranged in a maximum position, and the convection blow of the lower side is used at the efficiency of about 35%, for instance. When the heating continues, decreasing of the convection is started on the upper side, and correspondingly, increasing of the convection is started on the lower side in such a way that at the point of about 65% of the heating time the convection on the upper side and the convection on the lower side are equal. The efficiency of the upper and lower resistors is kept approximately in the same proportion as in which the convections function. At the final stage, the lower side convection blowing is at its maximum, and the upper side convection blowing is at a value of 65% of the maximum. After this, the glass is transferred into a cooling unit 19, and the next glass 4 arrives in the furnace.

The drawings and the related description are only intended to illustrate the idea of the invention. The details of the invention may vary within the scope of the claims. Thus, the dimensioning and position of the pipes in the furnace may vary as required. Further, the upper and lower surfaces of the glass 4 may be heated not only with convection blowing but also with upper resistors 5 and lower resistors 6, for example, but other heating methods are not necessary in addition to convection blowing. On the other hand, convection blowing may, as mentioned, be accompanied with heating resistors and/or even other ways to heat the glass 4 in addition to convection blowing.

What is claimed is:

1. An apparatus for heating glass, which apparatus comprises a tempering furnace comprising horizontal rollers arranged to support the glass and to form its conveyor; and means for sucking air from the inside of the tempering furnace and for circulating the air to be blown back at least onto the upper surface of the glass, comprising a pressurization unit; a return pipe of the upper side; and blow pipes of the upper side, which blow pipes are arranged in the vicinity of the surface of the glass, whereby the return pipe is arranged to convey air from the tempering furnace to the pressurization unit, and the pressurization unit is arranged to pressurize the air conveyed from the tempering furnace to an overpressure of 0.1 bar relative to the pressure of the tempering furnace, whereby the pressurized air is hot and arranged to be blown through the blow pipes of the upper side substantially perpendicularly onto the upper surface of the glass.

2. An apparatus according to claim 1, wherein the apparatus comprises a pressurization unit, a lower side return pipe and lower side blow pipes, whereby the lower side return pipe is arranged to lead air from the tempering furnace to a second pressurization unit, whereby the second pressurization unit is arranged to pressurize the air conveyed from the tempering furnace applying the compressor principle to an overpressure of over 0.1 bar relative to the pressure of the tempering furnace, and whereby the pressurized air is hot and arranged to be blown through the lower side blow pipes substantially perpendicularly onto the lower surface of the glass.

3. An apparatus according to claim 1, wherein the temperature of the air to be blown is over 600° C.

4. An apparatus according to claim 1, wherein the pressurization unit is arranged to pressurize the air conveyed from the tempering furnace to an overpressure of over 1 bar relative to the pressure of the tempering furnace.

5. An apparatus according to claim 1, wherein the apparatus comprises electric resistors for heating the glass.

6. An apparatus according to claim 1, wherein the rotational velocity of the pressurization unit is over 15,000 rotations per minute.

7. An apparatus according to claim 1, wherein the velocity of the air is arranged higher than 50 m/s when it exits from the blow pipe towards the surface of the glass.

8. An apparatus according to claim 1, wherein the blow pipes are provided with holes through which the air flows towards the surface of the glass, and wherein the diameter of said holes is below 2.5 mm.

* * * * *